United States Patent

[11] 3,580,344

[72] Inventor Johnnie E. Floyd
 2609 E. Side Drive, Austin, Tex. 78704
[21] Appl. No. 786,674
[22] Filed Dec. 24, 1968
[45] Patented May 25, 1971

[54] STAIR-NEGOTIATING WHEEL CHAIR OR AN IRREGULAR-TERRAIN-NEGOTIATING VEHICLE
11 Claims, 17 Drawing Figs.
[52] U.S. Cl............................................. 180/8-A,
 280/5.26
[51] Int. Cl..................................................... B62d 57/02
[50] Field of Search............................................ 180/8, 8.01;
 280/5.26

[56] References Cited
UNITED STATES PATENTS
2,931,449 4/1960 King.............................. 180/8(.01)
3,208,544 9/1965 Colvin........................... 180/51
3,241,848 3/1966 Flory............................. 280/5.26
3,283,839 11/1966 Brown et al.................... 180/8(.01)
3,348,518 10/1967 Forsyth......................... 180/8(.01)X
3,450,219 6/1969 Fleming......................... 180/8(.01)

Primary Examiner—Leo Friaglia
Attorney—Willard J. Hodges, Jr

ABSTRACT: A vehicle including a variable-length central frame upon which is pivotally and rotatably mounted multiple wheel assemblies. A central propelling means powering the wheel assemblies. A central propelling means powering the wheel assemblies through a central differential operably connected to individual planetary gear set differential wheel transmissions driving individual spider arm wheel assemblies which rotate the peripheral wheels and/or spider-arms as the need demands to climb or descend stairs, negotiate uneven terrain, and execute various maneuvers. The operator preselects through a central control a desired maneuver or function. The vehicle senses the most appropriate mechanical function and performs the maneuver by the optimum safe means.

PATENTED MAY25 1971

INVENTOR
JOHNNIE E. FLOYD
BY
ATTORNEY

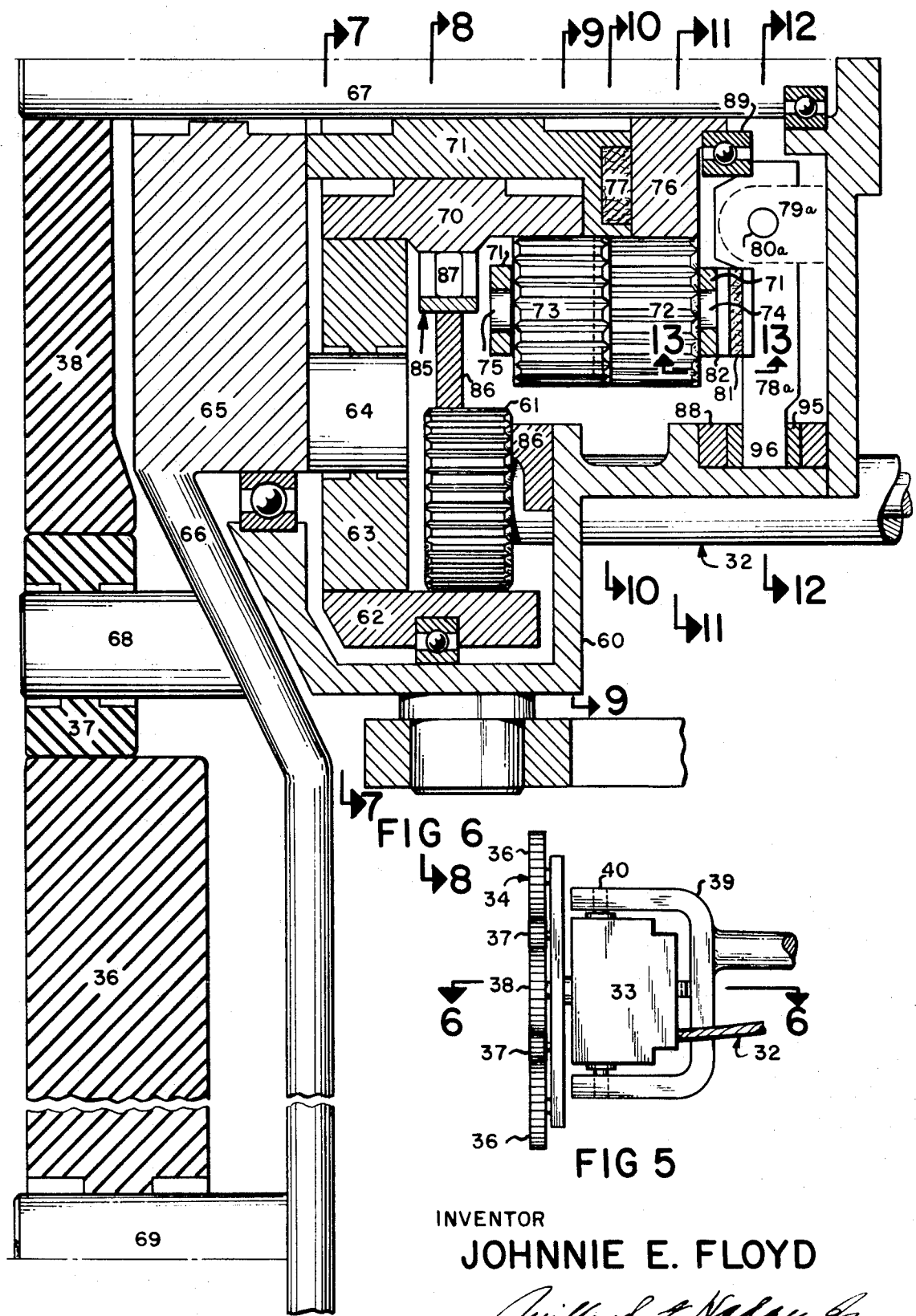

PATENTED MAY 25 1971 3,580,344

INVENTOR
JOHNNIE E. FLOYD
BY
ATTORNEY

INVENTOR
JOHNNIE E. FLOYD
BY
ATTORNEY

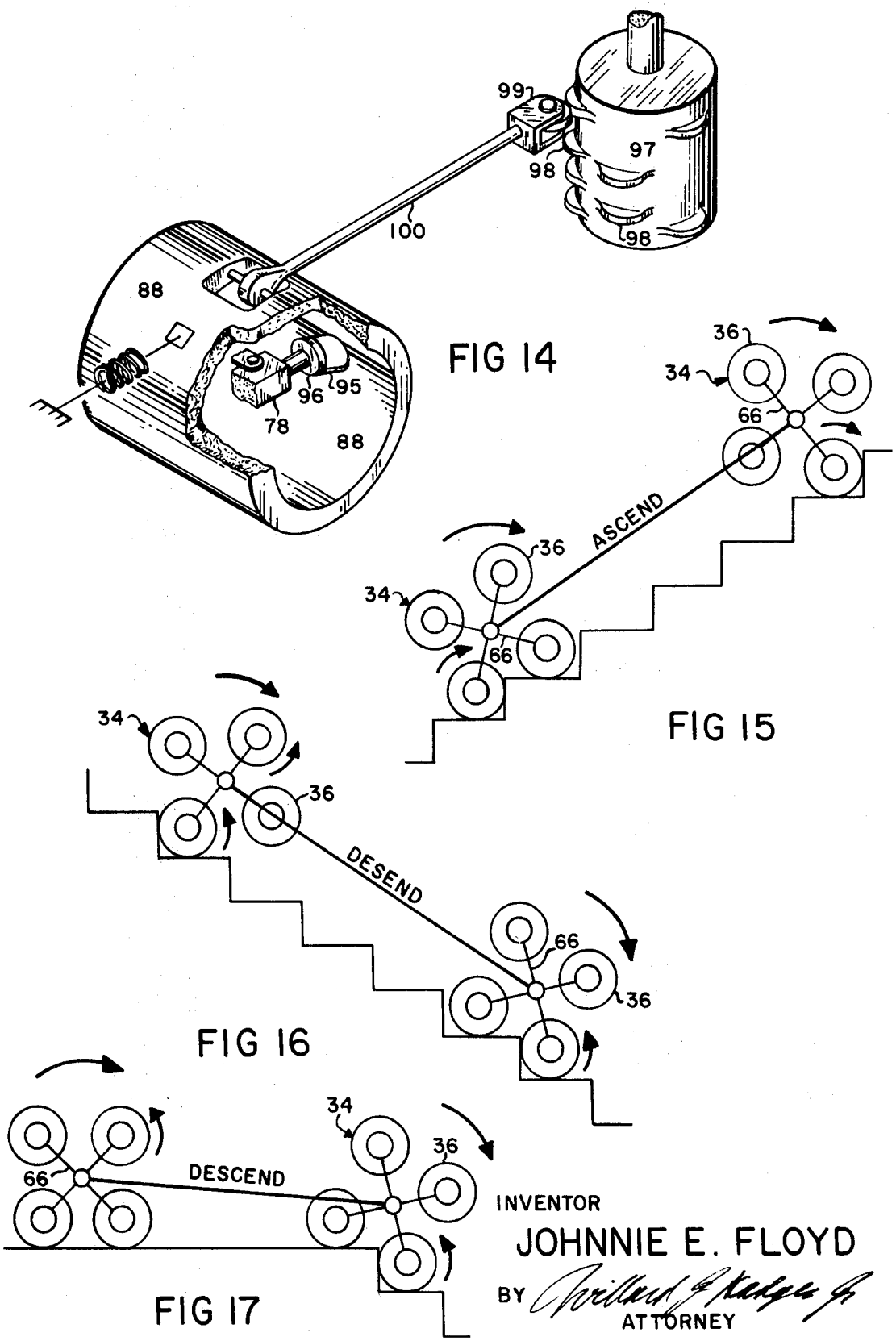

3,580,344

STAIR-NEGOTIATING WHEEL CHAIR OR AN IRREGULAR-TERRAIN-NEGOTIATING VEHICLE

The humanitarian and emotional demand for a stair negotiating wheel chair has resulted in attempts, concepts, and inventions resulting in patents. All of the existing concepts, of which the applicant is aware, leave much to be desired as to safety, maneuverability or demands on the operator.

The device of this invention has reduced the demands on the operator to preselecting a desired maneuver such as descend, ascend, spin, forward or reverse. If the ascent maneuver is selected, the machine rolls forward until an obstacle is contacted, remaining in contact, the spider arm steps up and rolls and climbs forward. In descending steps, after the first step is engaged, the peripheral wheels roll in reverse until a riser is contacted, remaining in contact with the abutment, the spider arm steps down. The vehicle in essence determines the optimum safe position, the lowest center of gravity, and performs a maneuver by the maximum safe method. The device will negotiate stairs or terrain of random or varying tread or riser sizes. The only operational limitation of the device is that the peripheral wheel of an assembly must be able to reach and firmly contact the next step. The vehicle might have any number of spider wheel assemblies, three or more are preferred. As for peripheral wheels, and spider arms, four have been chosen for this description. Any number may be used, three or more are preferred. Any source of power for propulsion might be used, in the wheel chair configuration, a storage battery driving an electric motor is selected. The motor drives a central differential which, through flexible drive means, motivates transmissions at each spider wheel assembly. These highly modified planetary gear set differential transmissions propel the spider mounted wheel assembly permitting infinitely varied maneuvers and negotiations of stairs or uneven terrain at the optimum safe attitude. The transmission and power train combination is adopted to negotiate extremely uneven terrain in a land vehicle concept.

The primary object of this invention was to provide a vehicle which would at a preselected control function ascend or descend uneven terrain or stairs by sensing the functional need and execute the required maneuver through the decision-making function of a differential. The need to be accomplished was to ascend or descend automatically in the safest attitudes leaving the decision making to mathematically exact mechanical means rather than the judgment of the possibly crippled, infirm or invalid operator.

For a detailed description of this invention, attention is invited to the several attached drawings wherein like referenced characters refer to identical or equivalent components throughout the various views.

FIG. 5 is a perspective view of one of the wheel transmission and wheel assembly, including a yoke mounting means.

FIG. 6 is an elevation fragmentary sectional view of a wheel transmission and wheel assembly taken substantially on line 6—6 of FIG. 5 on a plane sectioning the wheel transmission in the direction of the arrows.

FIG. 14 is a perspective view partially schematic of the circular transmission control cam and the related control drum and interconnecting components.

FIG. 15 is a schematic diagram of the device ascending a series of steps or stairs; the outer arrows indicate the direction of rotation of the spider arm wheel assemblies; the inner arrows indicate the direction of rotation of the peripheral wheels.

FIGS. 16 and 17 are schematic diagrams similar in report to FIG. 15; they, however, depict the device in a descending mode of operation.

Figure 1:
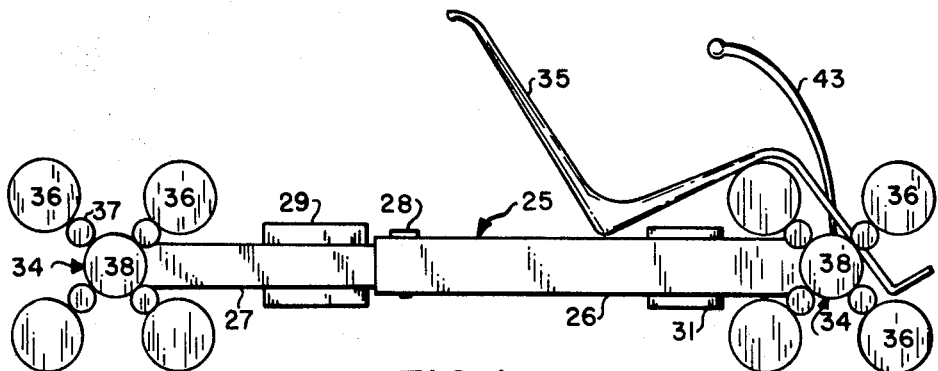
FIG. 1 is a side view of the vehicle partially in schematic depicting the vehicle in the wheel chair configuration.
Figure 2:
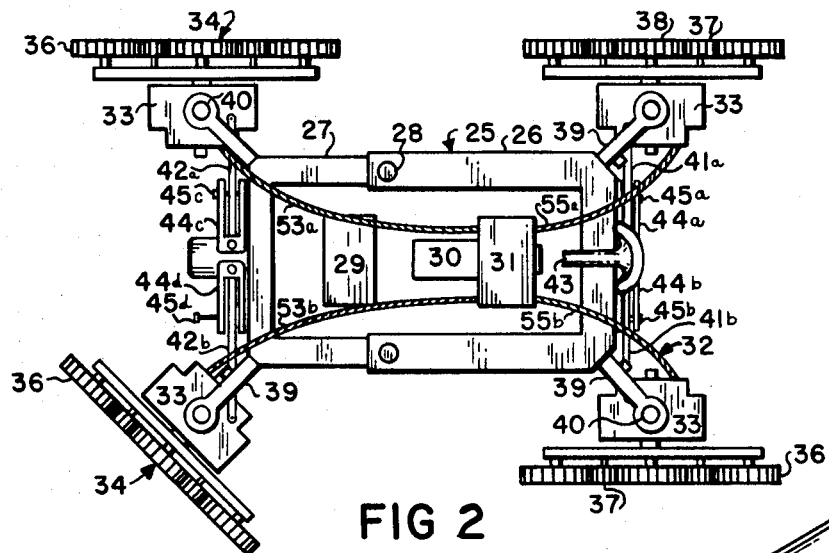
FIG. 2 is a top plan view of the above vehicle partially fragmented and schematic disclosing the chassis and a propulsion means.

For a more detailed description, attention is invited to FIGS. 1 and 2 illustrating a preferred embodiment of this invention depicting a stair-negotiating wheel chair.

As is typical of wheel-driven vehicles, the device is assembled around a central frame 25. The central frame 25 is constructed with a forward frame section 26 with an aft frame section 27 telescopingly mounted thereon to permit selective variation in the wheel base of the vehicle. Frame-locking means 28 are provided to secure the two sections when the desired wheel base has been selected and set. Mounted within the perimeter of the central frame 25 are the various propulsion components such as the main battery 29, the electric drive motor 30, the central differential 31, with four drive shaft assemblies 32 interconnecting the central differential 31 and the wheel transmission 33 of the spider wheel assemblies 34. As previously stated, the vehicle should include three or more spider wheel assemblies 34 pivotally mounted at the peripheral corners of the vehicle. In the embodiment illustrated in FIGS. 1 and 2, four spider wheel assemblies 34 are utilized. It should be understood that the propulsion means herein illustrated is adaptable to a wide variety of uneven- or rough-terrain-negotiating vehicles in addition to the wheel chair illustrated and described in detail. Referring to FIG. 1, a suggested configuration is shown embodying a passenger seat 35, illustrating spider wheel assemblies 34 suggesting four peripheral wheels 36 with four intermediate wheels 37 and a central drive wheel 38. The wheel transmission 33 may be pivotally attached to central frame 25 by means of a transmission yoke 39 and a transmission king pin 40. To provide a steering control means forward steering rods 41 a and b and aft steering rods 42 a and b are provided. These rods may be selectively engaged or released by means of the steering-rod-securing pins 45 a, b, c, & d of the steering rod brackets 44 a, b, c & d. A variety of steering means might be employed, however, for the purpose of simplicity, a steering tiller 43 is schematically illustrated.

The illustration of the wheel chair has been made for the primary purpose of describing a use for the hereinafter-described power train susceptible to the wide variety of uses and adaptations.

Figures 3, 4:
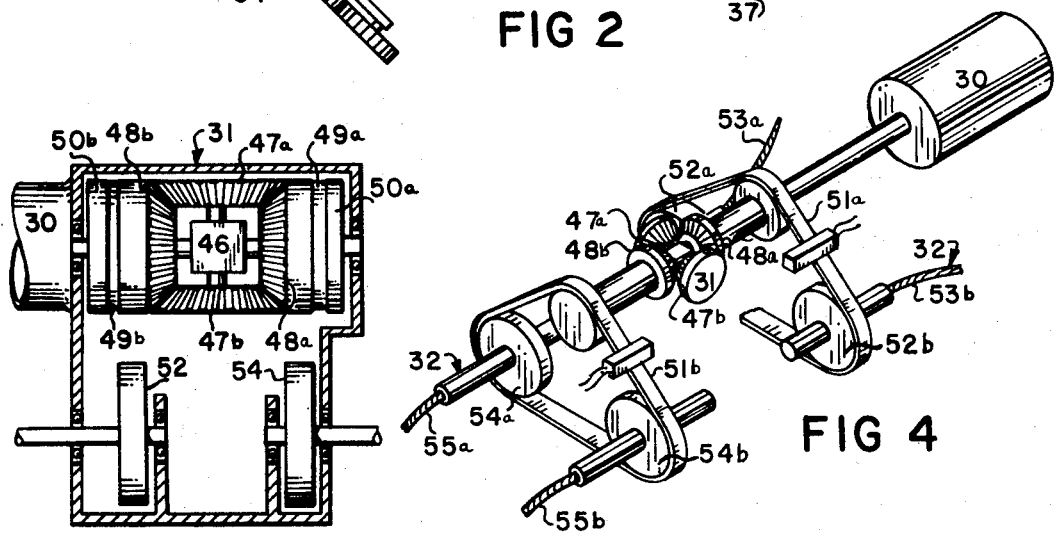
FIG. 3 is an elevation view of an embodiment of a central differential partially in section.
FIG. 4 is a perspective view partially schematic of the central differential suggesting an alternative braking means.

Particular reference is made to FIGS. 3 and 4 for more detailed description of the central differential 31. FIG. 3 illustrates a central differential 31 interconnecting an electric drive motor 30 and the drive shaft assemblies 32. Power is supplied to the central differential 31 through the differential power arm 46, mounted for rotation on this differential power arm 46 are differential arm gears 47 a and b, which are meshed with differential gears 48 a and b. To facilitate control of the system and insure the desired operational characteristics such as negotiating steep grades, braking means are provided for each of the differential gears 48 a and b. Brake Faces 49 a and b and pressure plates 50 a and b are shown. Other types of braking means might equally well be utilized. Referring more particularly to FIG. 4 a schematic view of a central differential 31, the differential gears 48a are connected to rear toothed belt 51 a to a pair of rear drive sprockets 52 a and b. These rear drive sprockets 52 a and b are secured to flexible rear drive shafts 53 a and b which drive the rear wheel transmissions 33. The combination receives its propulsion force from the differential gear 48a; whereas, differential gear 48b through the forward toothed belt 51b rotates the forward drive sprockets 54 a and b which is secured to the flexible forward drive shafts 55 a and b. The exploded schematic of the central differential 31 (FIG. 4) suggests an alternative differential braking means in that brake faces 49 a and b and pressure plates 50 a and b might be replaced by equivalent functional structures operated electrically, frictionally or otherwise to either the rear toothed belt 51a or the forward toothed belt 51b.

FIG. 5 illustrates the outer configuration of a wheel transmission 33 and the associated spider wheel assembly 34. The rear and forward drive shaft 53 a and b and 55 a and b, are illustrated which power the wheel transmissions 33 which will be further described in detail as it constitutes the major contribution to the art of this invention.

The details of the construction of the wheel transmission 33 is best illustrated in FIG. 6, in conjunction with related following sectional views FIGS. 7, 8, 9, 10, 11 and 12. The transmission case 60 in essence contains the power-transmitting components and control means. The transmission case 60 is mounted in the transmission yoke 39 by means of the transmission king pin 40 previously referred to. The power supply for each wheel transmission 33 is through the rear and forward drive shafts 53 a and b and 55 a and b. Mounted on each of the drive shafts is the power drive gear 61. The rear and forward drive shafts 53 a and b and 55 a and b are mounted for rotation in a bulge in the transmission case 60. The power drive gear 61 is meshed with and drives a large ring gear 62 which is part of the planetary set differential. Ring gear 62 drives arm gears 63 which are mounted for rotation on spider arm studs 64 which project from spider block 65. The spider block is an integral structure with some three or four spider arms 66 projecting radially from the spider block 65. This spider block 65 is mounted in ball or needle bearings in the transmission case 60. Projecting through the center of the spider block 65 is a central wheel drive shaft 67 upon which is mounted the central drive wheel 38. The intermediate arm studs 68 and peripheral arm studs 69 are firmly attached to spider arm 66. Mounted on the intermediate arm stud 68 by suitable bearing and retaining means is the intermediate wheel 37. Mounted for rotation on the peripheral arm stud 69 by suitable bearing means is the peripheral wheel 36. Although the above referred to wheels may vary in design and construction, a positive meshing gear tread has been illustrated. Arm gear 63 meshes with and drives transfer gear 70 which is concentrically mounted around the central wheel drive shaft 67. However, there is juxtapositioned arm 71 which is one of the components of the modified spur gear differential forming a highly important functional complex of the wheel transmission 33. Engaging transfer gear 70 and rotatably mounted at equiangular positions are two outer spur gears 73. Intermeshed therewith are two matching inner spur gears 72. These spur gears 72 and 73 are mounted in the arm 71 for rotation on inner spur gear shafts 74 and outer spur gear shafts 75. Meshed with the inner spur gear 72 is wheel drive gear 76. This wheel drive gear 76 is slidably keyed to the central wheel drive shaft 67. Between the wheel drive gear 76 and the arm 71 is positioned a descend clutch 77. Control arms 78 a and b are pivotally mounted on the transmission case 60 by means of the control arm brackets 79 a and b and the control arm pivot pins 80 a and b. The control arms 78 a and b lay radially out from central wheel dive shaft 67 and are spaced equiangularly. On the above referred to control arms 78 a and b is operably positioned an ascend clutch 81 including an ascend clutch face 82.

A study of FIG. 6 discloses that the engagement of the descend clutch 77 would prohibit relative rotation of transfer gear 70, arm 71, inner and outer spur gears 72 and 73 and wheel drive gear 76. Whereas, the engagement of ascend clutch 81 would lock the arms 71 relative to the transmission case 60, however, the gears 70, 72, 73 and 76 remain free to rotate. The significance of this function is a most important feature of this invention and will be discussed further.

Although the construction of the wheel transmissions 33 are substantially illustrated in FIG. 6, the various sectional views of FIG. 6 depicted in FIGS. 7, 8, 9, 10, 11 and 12 give a more complete illustration of the various components and their relative positions.

Figure 8:
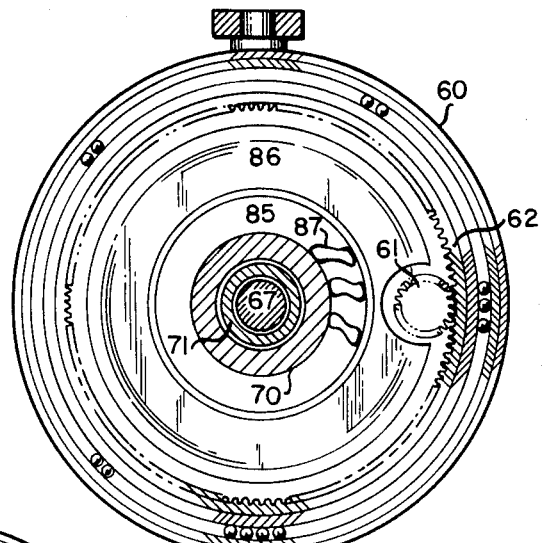
FIG. 8 is a sectional view of a wheel transmission taken substantially on line 8—8 of FIG. 6.

FIG. 6 and FIG. 8 illustrate an important function as well as a safety feature which is the overrunning clutch 85 mounted concentric with transfer gear 70. Overrunning clutch 85 is firmly secured to the transmission case 60 by means of the overrunning clutch bracket 86. The spragforms 87 are positioned in such a manner as to prevent clockwise rotation of the transfer gear 70.

Figure 7:
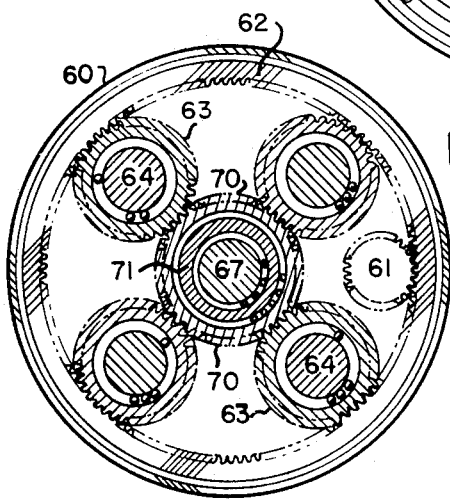
FIG. 7 is a sectional view of a wheel transmission taken substantially on line 7—7 of FIG. 6.

With particular reference to FIG. 7, the sectional presentation of a complete wheel transmission 33 which was fragmentarily illustrated in FIG. 6, the central wheel drive shaft 67 is disclosed surrounded by a section of arm 71, which in turn is surrounded by transfer gear 70. In the structure suggested in FIG. 7, four arm gears 63 are illustrated mounted on four spider arm studs 64. The arm gears 63 are meshed with ring gear 62 which is driven for rotation by power drive gear 61. These components are mounted for rotation in transmission case 60.

Ring gear 62, arm gear 63, spider arm stud 64 and transfer gear 70 constitute subcombination of components which hereinafter may be referred to as a planetary differential. The purpose of this planetary differential is to deliver torque and motion from ring gear 62 to the stud 64 and the transfer gear 70.

Referring now to the section illustrated in FIG. 8, we again observe portions of some of the components illustrated in FIG. 7. We now, however, illustrate the overrunning clutch 85 secured to the transmission case 60 by means of the overrunning clutch bracket 86. The spragforms 87 are illustrated surrounding and engaging the transfer gear 70 preventing its clockwise rotation.

Figure 9:
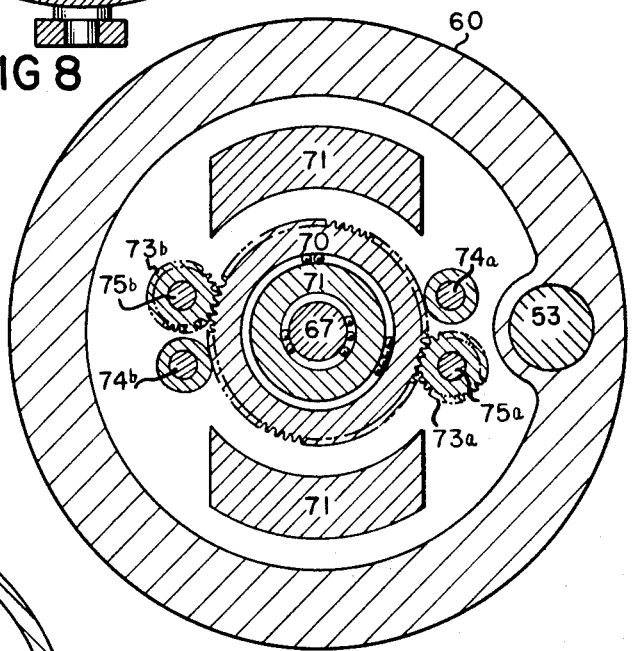
FIG. 9 is a sectional view of a wheel transmission taken substantially on Line 9—9 of FIG. 6.

FIG. 9 illustrates a section of the device which includes the basic components of the spur gear differential which will reverse the direction of rotation of the peripheral wheels 36 with respect to the direction of the rotation of spider arm 66. Transfer gear 70 is illustrated mounted on the arm 71 and in engagement with the two outer spur gears 73 a and b mounted for rotation on their outer spur gear shafts 75 a and b. This sectional view also illustrates one of the drive shafts 53 a and b or 55 a and b retained and mounted for rotation in the transmission case 60. Arm 71, transfer gear 70, outer spur gear 73, inner spur gear 72 and wheel drive gear 76 which may hereinafter be referred to as a spur gear differential.

Figure 10:
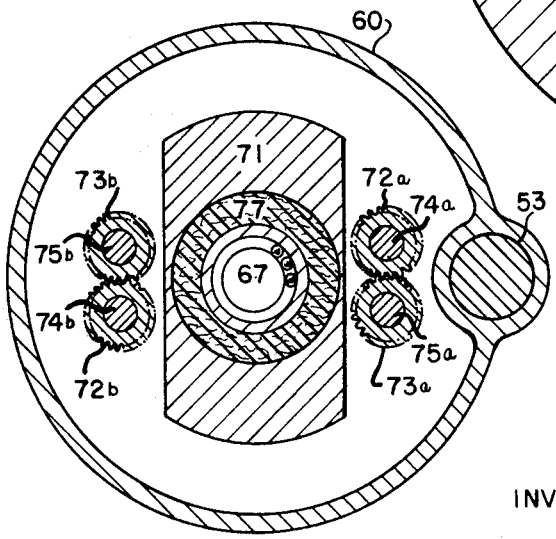
FIG. 10 is a sectional view of a wheel transmission taken substantially on Line 10—10 of FIG. 6.

The sectional view in FIG. 10 illustrates the central section of the spur gear differential. A cross section of the arm 71 illustrates the meshing of the inner spur gear 72 and the outer spur gear 73 and their respective mountings on shafts 74 and 75. A section of the descend clutch 77 is illustrated mounted on arm 71 which is rotatably mounted on central wheel drive shaft 67. The arm 71 is free to rotate in the transmission case 60 subject to various clutch controls and propelling forces.

Figure 11:
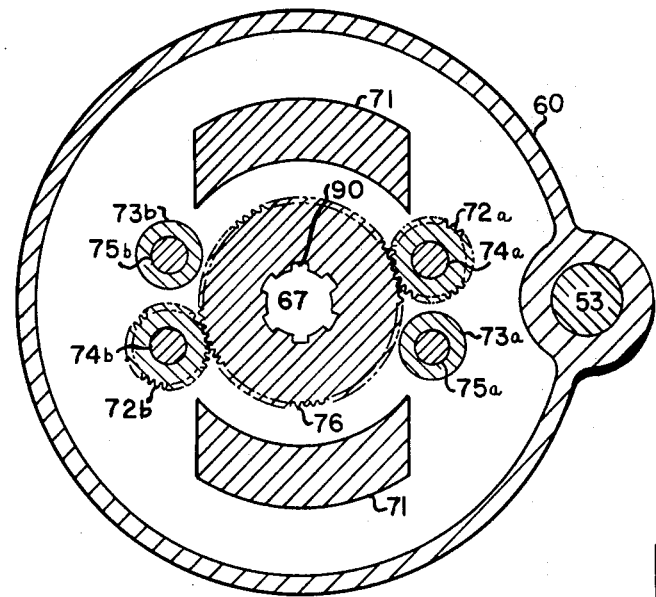
FIG. 11 is a sectional view of a wheel transmission taken substantially on Line 11—11 of FIG. 6.

FIG. 11 is in a measure the reverse of FIG. 9. The arm 71 is illustrated, a portion of which retains the inner spur gears 72 a and b and the outer spur gears 73 a and b by means of the inner and outer spur gear shafts 74 and 75. The wheel drive gear 76 is slidably keyed by means of a wheel drive gear keying means 90 on central wheel drive shaft 67 in such a manner as to frictionally engage descend clutch 77.

Figure 12:
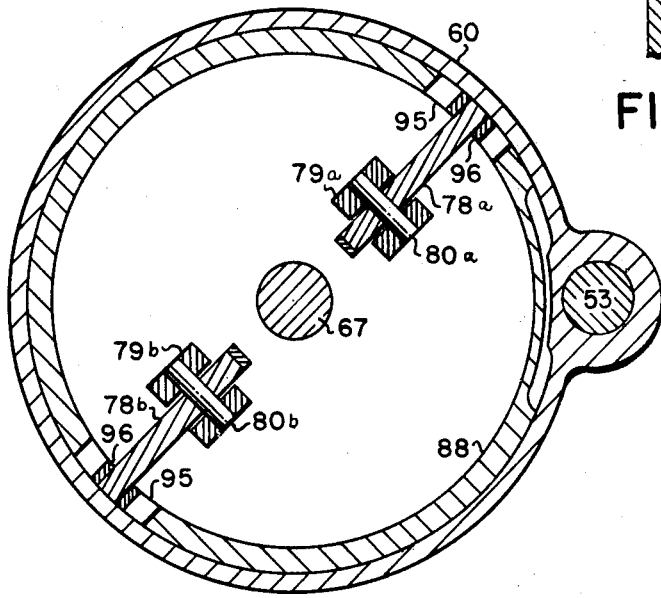
FIG. 12 is a sectional view of a wheel transmission taken substantially on Line 12—12 of FIG. 6.

Referring to FIG. 12, we observe a bulge in the transmission case 60. Another component not previously referred to is the circular transmission control cam 88 which is illustrated in more detail in FIG. 14. We have illustrated in substantial detail the control arm 78 a and b and its relative position and function pertaining to wheel drive gear 76 and the associated descend clutch 77 illustrated in FIGS. 10 and 11. FIG. 12 illustrates control arm bracket 79 a and b of the control arm 78 a and b operably projecting into circular transmission control cam 88. The operable contact between the control arms 78 a and b and the wheel drive gear 76 is the wheel drive gear bearing means 89 FIG. 6.

Figure 13:
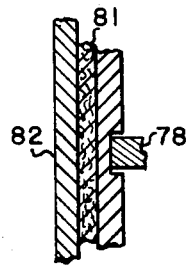
FIG. 13 is a fragmented sectional view of the ascend clutch taken substantially on Line 13—13 of FIG. 6 looking in the direction of the arrows and suggest some of the details of construction of the clutch structure.

FIG. 13 is a fragmented sectional view of the ascend clutching surface illustrating a portion of a control arm 78 a or b, the ascend clutch 81, and the ascend clutch face 82.

FIG. 14 illustrates a structure which can be utilized for positioning the circular transmission control cam 88. From the sketch it can be observed that a multiplicity of control arms 78 a and b are desirable to insure positive action in the system. The circular transmission control cam 88 is constructed with diagonal camming segments 95. The control arm cam follower 96 is snugly mounted in the diagonal camming segment 95 in such a manner as to cause the control arm 78 to move responsive to rotation of the circular transmission control cam 88. Hydraulic, electrical or mechanical means may be used, but for the purpose of this disclosure, a mechanical control means has been selected. A manually positioned control drum 97 is illustrated with the series of cam lifts 98. Contacting the control drum 97 operably aligned with each row of the cam lifts 98 is a series of cam followers 99 which are operably attached to each of the wheel transmissions 33 by means of a cam pushrod 100. These rods may be comprised of sheathed, flexible cables. As is readily apparent from an inspection of FIG. 14, various combinations of cam lifts 98 with various profiles or heights of lift will result in varying combinations of actions being effected through the control arms 78 of the various wheel transmissions 33. When the circular transmission control cam 88 is rotated to one of its three positions, definite control functions are selected. The diagonal camming segments 95 are constructed such that when the circular transmission control cam 88 is rotated to its extreme clockwise position the transmission 33 is made ready to ascend, when the circular control cam 88 is rotated to its extreme counterclockwise position the transmission 33 is made ready to descend, and when the circular transmission control cam 88 is rotated midway between the extremes, the transmission is placed in neutral. In ascend, peripheral wheels roll forward; in descend, peripheral wheels roll rearward and in neutral, no driving power is transmitted to the peripheral wheels. To function properly, a multiplicity of control arms 78 a and b are required. These arms, however, apply pressure to unitary ringlike structures, ascend clutch 81 or descend clutch 77.

For a description of the drive through individual wheel transmissions 33 reference is particularly made to FIG. 6 and the related sectionalized views in FIGS. 7 through 13. Drive shaft 32 rotates in a clockwise direction rotating drive gear 61 which drives ring gear 62 clockwise which is geared with and drives arm gear 63 which is mounted on and rotates on arm stud 64. Gear 63 drives transfer gear 70 always in a counterclockwise direction due to the restraint of the spragforms 87. Arm 71 which might be referred to as a plate 71 carries innerspur gear 72 to outer spur gear 73. Outer spur gear 73 engages transfer gear 70 while inner spur gear 72 meshes with wheel drive gear 76. Direction of rotation of wheel drive gear 76 determines the direction of rotation of the peripheral wheels 36 which in the preferred embodiment in operation each turns in the same direction. Between wheel drive gear 76 and arm 71 is positioned descend clutch 77 which is operated by control arm 78 a and b. Positioned also on arm 71 is ascend clutch 81 which when locked by movement of control 78 a and b locks arm 71 leaving the gears free to rotate. Ascend clutch 81 unlike the descend clutch 77 leaves the inner and outer spur gear 72 and 73 and wheel drive gear 76 free to rotate.

The most difficult maneuver to accomplish by a wheel vehicle is to descend stairs; accordingly, the descending mode of operation of a wheel transmission 33 will be first explained.

The path of rotation through the wheel transmission 33 when descend clutch 77 is engaged is: a clockwise rotation of drive shaft 32 rotates power drive gear 61 clockwise which rotates ring gear 62 clockwise and rotates spider arm stud 64 clockwise when spider arm stud 64 is free to rotate, and when spider arm 66 and spider arm stud 64 remain stationary transfer gear 70 would be driven counterclockwise carrying arm 71, inner spur gear 72, outer spur gear 73, wheel drive gear 76, central wheel drive shaft 67 and central drive wheel 38. Central drive wheel 38 then would drive intermediate wheel 37 clockwise which would drive peripheral wheel 36 counterclockwise. The net result of this gear train for descend is to rotate the first peripheral wheel 36 counterclockwise back against the riser and while retaining there a rotate arm 66 clockwise about the first peripheral wheel 36 such that the next adjacent peripheral wheel 36, positioned counterclockwise from the first peripheral wheel 36 in the wheel assembly 34, is moved beyond and over the next stair riser until it comes to rest against the next lower tread. Peripheral wheel 36 can be rotated counterclockwise when arm 66 is stationary, arm 66 can be rotated clockwise when wheel peripheral wheel 36 is stationary, and arm 66 and peripheral wheel 36 can be rotated simultaneously. The choice between the above three abilities is determined by the relative resistance to movement between the two paths of rotation and the motion always is transmitted to the least resistant path automatically. No external control device is required. This function is elsewhere referred to in this disclosure as the decision-making function of the differential herein described for ascending mode of operation.

In the ascending mode of operation control arm 78 a and b would engage ascend clutch 81 locking arm 71 to the transmission case 60. For ascend as in descend, power drive gear 61 is driven clockwise which drives ring gear 62 and arm gear 63 clockwise. Transfer gear 70 would be driven counterclockwise which would drive outer spur gear 73 clockwise and consequently inner spur gear 72 counterclockwise. The inner spur gear 72 would drive wheel drive gear 76 clockwise carrying wheel drive shaft 67 and central drive wheel 38 clockwise, transfer wheel 37 counterclockwise and peripheral wheel 36 clockwise. The net result in ascend is to cause a first peripheral wheel 36 to roll forward clockwise until an obstacle or stair riser is contacted and while retaining wheel 36 against the riser, then rotate arm 66 about the first peripheral wheel 36 until the next adjacent peripheral wheel 36 position counterclockwise in the wheel assembly 34 moves over onto the next higher stair tread. Peripheral wheel 36 can be rotated clockwise while arm 66 is stationary. Arm 66 can be rotated clockwise while wheel 36 is stationary, and both peripheral wheel 36 and arm 66 can be rotated simultaneously. The choice between the above three abilities is determined by the relative resistance to rotation between the two paths of rotation and motion is always transmitted to the least resistive path automatically. No external control device is required. This function is elsewhere referred to as the decision-making function of the differential herein described for the ascend mode of operation.

The mode of operation of the device when the control arm 78 a and b is in a neutral position, such that neither descend clutch 77 or ascend clutch 81 are engaged, is to leave arm 71 free to rotate in any direction. The rotation of the peripheral wheels 36 would be independent of the rotation of the power drive gear 61. We can correctly say that any motive force would be spun off internally of the transmission 33 by the freedom of rotation of arm 71 carrying inner and outer spur gears 72 and 73. Accordingly, if the clutching system of the transmission is placed in neutral wheels 36, 37, 38 as well as spider arm 66 are permitted to rotate freely in any direction.

Numerous maneuvers of the vehicle are possible by placing the individual wheel transmissions 33 in the desired position and imparting a desired operating function. It is quite apparent by reference to FIG. 2 that a spinning in position can be effected by driving diagonal spider wheel assemblies 34 in opposite directions after releasing all steering rod securing pins 45 a, b, c and d.

A further alternative operating function is hereby suggested by providing means on the transmission housing for engaging a spider arm 66 and locking a spider wheel assembly 34 in such a position as to have only one peripheral wheel 36 contacting the ground at each said spider wheel assembly 34. This position is useful only for negotiating relatively smooth, flat terrain.

Attention is invited to FIGS. 15, 16 and 17 to illustrate schematically the relative functions of the spider wheel assemblies 34, the peripheral wheels 36 and the spider arms 66 in performing the ascend and descend function. The direction of rotation of the various components can be traced through the wheel transmission 33 and FIG. 6 from the power drive gears 61 as affected by the function of the descend clutch 77 and the ascend clutch 81. It is sufficient to say that in the ascend mode of operation the peripheral wheels 36 as well as the spider arms 66 are driven in a clockwise direction. The peripheral wheels 36 roll the device forward until the peripheral wheel 36 strikes an abutment or riser of the step at which time the spider wheel assemblies 34 or spider arm 66 through the differential action of the wheel transmission 33 will be driven clockwise. This results in the device stepping up to the next level surface.

In descending, after the leading spider wheel assembly 34 is moved forward over the riser, and onto the step and the device is placed in the descend mode of operation, the peripheral wheels 36 will be driven counterclockwise until it strikes or seats itself against the riser; again through resulting power flow of the wheel transmission 33, the wheel assembly 34 or spider arms 66 will be driven clockwise and in essence steps down. It is extremely important to note that the differential action of the wheel transmission 33 in the descending mode of operation does not permit a stepping down action of the spider arms 66 until the peripheral wheels 36 are seated in the safest position against the riser of the step.

Another operational feature of the wheel transmission 33 which should be noted is the function of the overrunning clutch 85 which prevents a clockwise rotation of transfer gear 70. In the absence of overrunning clutch 85 or an equivalent detent to prevent clockwise rotation of the transfer gear 70, the device would not function as desired in the descending, as well as the ascending, mode of operation. If the rear wheel assemblies 34 or spider arm 66 were to climb forward in the descending mode of operation, they could transmit through the central differential 31 a clockwise rotation to the peripheral wheels 36 of the forward wheel assemblies 34 resulting in a rolling action of the forward wheel assemblies 34 and the stepping forward action in the rear wheel assemblies 34 and the device would tumble to the bottom of the stairs. The overrunning clutch 85 permits the transfer gear 70 to rotate only in the counterclockwise direction, preventing any such inconsistent action by the wheel transmission 33 or the spider wheel assemblies 34 or the spider arm 66. Thus, a safe, compatible control action is built into the device.

Another possible undesirable action which is controlled or prevented in the climbing mode of operation is a possible oscillation in place. In ascending stairs, the resulting tilt in the chassis or central frame 25 results from the shift of the center of gravity or mass toward the rear spider wheel assemblies 34. When such a condition exists, the forward spider wheel assemblies 34 can step or oscillate in place much as the one wheel of an automobile on a slick surface utilizing a conventional differential. To prevent such an oscillation is one of the functions of the braking means such as brake faces 49 a and b and pressure plates 50 a and b in the central differential 31. A braking load can be applied to the lightly loaded spider wheel assemblies 34 at the output of the central differential 31 to prevent this oscillation or walking in place.

Rotation or turning of the vehicle in the diagonal diameter of its own axis may be accomplished by removing the steering-rod-securing pins 45 a, b, c and d from the steering rod brackets 44 a, b, c and d which will permit the spider wheel assemblies 34 or the wheel transmission 33 to assume a diagonal position in the transmission yoke 39. In this mode of operation, the ascend function is imparted to one wheel assembly 34 and a descend function to a diagonal opposite spider wheel assembly 34, the device will rotate in place within its own diameter. The device can be made to spin in either direction, with no lateral movement, rotating about its own geometric center.

The device is capable of numerous maneuvers by applying various control signals combinations and/or steering controls to the spider wheel assemblies 34, each of which may be made to operate entirely independent of any other spider wheel assembly 34.

Having described the device, the overall combination of the vehicle in some detail, the wheel transmission, and wheel assemblies what is desired to be claimed is all adaptations of this disclosure falling within the inventive concept described and within the scope or equivalence of the appended claims.

What I claim is:

1. An uneven-terrain-negotiating vehicle:
   a. a frame having a front portion and a rear portion,
   b. a central control means mounted on said frame,
   c. power means mounted on said frame,
   d. a multiplicity of wheel transmissions mounted adjacent to periphery of said frame constructed and arranged so as to have at least one wheel transmission mounted on the front portion of said frame and at least one wheel transmission mounted on the rear portion of said frame,
   e. a central differential means operably interconnected to said power means and said wheel transmissions, said differential constructed and arranged to differentially supply rotating force to said wheel transmission mounted on the front portion of said frame and said wheel transmission mounted on the rear portion of said frame,
   f. a braking means operably associated with said central differential adapted to selectively retard the output of said differential to a wheel transmission,
   g. wheel assemblies mounted for rotation on each said wheel transmission including peripheral wheels and spider arms, and
   h. control means including selective clutching means operably integrated with each said wheel transmission selectively imparting rotating force to peripheral wheels or spider arms through a planetary gear set differential of said wheel assemblies.

2. The invention of claim 1 wherein each said wheel transmission and wheel assemblies comprise:
   a. a multiplicity of wheels constituting an epicyclic gear train,
   b. a multiplicity of spider arms driven in rotation by said wheel transmission, and
   c. gear means adapted for rotating said peripheral wheels in a direction of rotation opposite to the direction of rotation of said spider arms.

3. The invention of claim 1 wherein each said wheel transmission and wheel assemblies comprise:
   a. a multiplicity of wheels constituting an epicyclic gear train,
   b. a multiplicity of spider arms driven in rotation by said wheel transmission, and
   c. said wheel transmission including gear means comprising a planetary gear set differential interconnecting said wheel means and said spider arms constructed in such an arrangement to differentially supply rotating force between said wheels and said arms.

4. The invention of claim 1 wherein each said wheel transmission includes:
   a. a spur gear differential;
   b. said spur gear differential including an arm,
   c. spur gears rotatably secured to said arm,
   d. a transfer gear driving a spur gear,
   e. a wheel drive gear receiving the output of said spur gear,
   f. a clutching surface integral with said spur gear arm, and
   g. control means, including a pivotally mounted control arm adapted to selectively clutch and declutch said clutch surface of said arm.

5. The invention of claim 4 including:
   a. clutching surface integral with said wheel drive gear, and
   b. said control means including a control arm adapted to selectively clutch and declutch said wheel drive gear clutching surface.

6. The invention of claim 1 wherein the said central control means comprises:
   a. a control drum,
   b. a multiplicity of cam lifts secured to said control drum,
   c. means for rotating said control drum,
   d. cam followers mounted adjacent said control drum in such a manner as to follow the contour of said cams; and
   e. cam pushrods interconnecting said cam follower and said control means of each said wheel transmission.

7. An uneven-terrain-negotiating vehicle comprising:
   a. a frame,
   b. power means mounted on said frame,
   c. a multiplicity of wheel transmissions mounted adjacent the periphery of said frame,
   d. wheel assemblies attached to said wheel transmission,
   e. said wheel assemblies comprising wheels,
   f. said wheel assemblies comprising spider arms,
   g. said wheel transmissions each including gear means comprising a planetary gear set differentially interconnecting said wheels and said spider arms of said wheel assembly, and
   h. an overrunning clutch integral with each said wheel transmission restricting rotation of input gear means to rotation in one predetermined direction of rotation.

8. The invention of claim 7 wherein each said wheel transmission includes:
   a. a power drive gear operably driven by the said power means,
   b. a ring gear meshed with said power drive gear,
   c. an arm gear meshed with and driven by said ring gear, and
   d. a transfer gear meshed with and driven by said arm gear.

9. The invention of claim 7 wherein each said wheel transmission includes:
   a. a transfer gear driven by an arm gear,
   b. an overrunning clutch encompassing said transfer gear, said overrunning clutch constructed and arranged so as to permit only counterclockwise rotation of said transfer gear, and
   c. spur gears meshed with an driven by said transfer gear.

10. The invention of claim 7 wherein each said wheel transmission includes:
    a. an arm integral with said wheel transmission and rotatably mounted therein,
    b. spur gears rotatably mounted on said arm and driven by said power means,
    c. a wheel drive gear meshed with spur gear,
    d. a circular transmission control cam mounted for rotation in said transmission,
    e. a camming segment integral with said circular transmission control cam,
    f. a control arm pivotally mounted in said wheel transmission operably engages said camming segment moving responsive to rotation of said transmission circular control cam, and
    g. a multiplicity of clutching surfaces selectively engaged by said control arm.

11. The invention of claim 7 wherein said wheel transmission gear means is adapted for rotating peripheral wheels in a direction of rotation opposite to the direction of rotation of said spider arms for descending stairs or the like.